US011763522B2

(12) United States Patent
Hu et al.

(10) Patent No.: US 11,763,522 B2
(45) Date of Patent: Sep. 19, 2023

(54) 3D RECONSTRUCTION METHOD BASED ON ON-SITE EDGE-CLOUD COLLABORATION FOR CULTIVATED LAND

(71) Applicant: South China Academy of Natural Resources S&T, Guangzhou (CN)

(72) Inventors: Yueming Hu, Guangdong (CN); Chun Chen, Guangdong (CN); Chi Xu, Guangdong (CN); Rui Zhang, Guangdong (CN)

(73) Assignee: South China Academy of Natural Resources S&T, Guangzhou (CN)

( * ) Notice: Subject to any disclaimer, the term of this patent is extended or adjusted under 35 U.S.C. 154(b) by 134 days.

(21) Appl. No.: 17/594,450

(22) PCT Filed: Nov. 25, 2020

(86) PCT No.: PCT/CN2020/131409
§ 371 (c)(1),
(2) Date: Oct. 15, 2021

(87) PCT Pub. No.: WO2021/115124
PCT Pub. Date: Jun. 17, 2021

(65) Prior Publication Data
US 2022/0180600 A1     Jun. 9, 2022

(30) Foreign Application Priority Data

Dec. 10, 2019   (CN) .......................... 201911261761.1

(51) Int. Cl.
*G06T 17/05*      (2011.01)
(52) U.S. Cl.
CPC .......... *G06T 17/05* (2013.01); *G06T 2200/08* (2013.01)

(58) Field of Classification Search
CPC ............... G06T 17/00; G06T 17/05; G06T 2207/10032; G06T 2207/30181;
(Continued)

(56) References Cited

U.S. PATENT DOCUMENTS

2009/0298017 A1* 12/2009 Boerjes ............... A61B 5/4547
                                                       433/214
2015/0243073 A1*  8/2015 Chen ..................... G06T 17/20
                                                       345/419
(Continued)

FOREIGN PATENT DOCUMENTS

| CN | 109658450 A | 4/2019 |
| CN | 110379022 A | 10/2019 |
| CN | 111080794 A | 4/2020 |

OTHER PUBLICATIONS

International Search Report dated Mar. 8, 2021 in International Application No. PCT/CN2020/131409.

*Primary Examiner* — Ryan McCulley
(74) *Attorney, Agent, or Firm* — SALIWANCHIK, LLOYD & EISENSCHENK

(57) ABSTRACT

The disclosure relates to a 3D reconstruction method based on an on-site edge-cloud collaboration for a cultivated land. An edge-cloud collaborative computing architecture is used, such that the edge computing device performs advance calculations after image data is acquired. The edge computing device measures performances of itself and a cloud data center, and arranges and deploys multiple 3D reconstruction containers in the cloud data center for the 3D reconstruction. Multiple reconstruction containers in the cloud data center perform reconstruction tasks in parallel to quickly obtain 3D reconstruction results, and provide them to the edge computing device for retrieval and download. This method is mainly oriented to agricultural project monitoring scenes, to reduce reconstruction time and a data transmission amount (Continued)

of 3D models, in order to improve a response speed and a quality of 3D reconstruction results, for large-scale on-site monitoring, acceptance, and review purposes of agricultural projects.

7 Claims, 8 Drawing Sheets

(58) Field of Classification Search
CPC ........... G06T 2207/30184; G06T 2207/30188; G06V 20/13; G06V 20/17
See application file for complete search history.

(56) References Cited

U.S. PATENT DOCUMENTS

| | | | |
|---|---|---|---|
| 2018/0286119 A1* | 10/2018 | Felip Leon | B25J 13/085 |
| 2019/0130641 A1* | 5/2019 | Barajas Hernandez | G06F 18/22 |
| 2019/0180501 A1 | 6/2019 | You et al. | |
| 2019/0354742 A1* | 11/2019 | Murakoshi | G06T 7/62 |
| 2020/0242749 A1* | 7/2020 | Hearst | G06V 20/17 |

* cited by examiner

3D RECONSTRUCTION METHOD BASED ON ON-SITE EDGE-CLOUD COLLABORATION FOR CULTIVATED LAND

CROSS REFERENCE TO RELATED APPLICATIONS

This application is the U.S. national stage application of International Application No. PCT/CN2020/131409, filed Nov. 25, 2020, which claims the benefit under 35 U.S.C. § 119 of Chinese Application No. 201911261761.1, filed Dec. 10, 2019, the disclosures of each of which are incorporated herein by reference in their entirety.

TECHNICAL FIELD

The disclosure relates to a field of image processing technique, in particular to a three-dimensional (3D) reconstruction method based on an on-site edge-cloud collaboration for a cultivated land.

BACKGROUND ART

At present, while China is formulating beneficial agricultural policies and establishing related agricultural projects, relevant management agencies also attach great importance to an implementation and effects of these policies and projects, and use various monitoring measures to track a project progress and ensure the implementation of policies. However, there are still many pain points regarding agricultural project monitoring.

It is difficult for agricultural projects to carry out real-time and efficient tracking and supervision. For example, since agriculture, rural areas, and farmland are large in scale and widely distributed, a monitoring and inspection of a complete agricultural project involves an excessively large scope. In terms of monitoring methods, government inspection agencies can only extract a very small percentage of sample data for inspection, while long-term tracking and monitoring can only passively rely on reporting written materials among administrative levels, so it is difficult to further improve the efficiency.

On the other hand, the current monitoring methods of agricultural projects have a disadvantage of not being able to balance real-time and a coverage. With respect to agricultural project monitoring, in recent years, a high-altitude remote sensing has been adopted in many studies to monitor farmland construction and production conditions. However, an actual transit cycle of a high-altitude remote sensing satellite is fixed, i.e. only a few times per year, which makes it difficult to perform a fine-grained spatiotemporal analysis. In addition, regardless of weather conditions, a satellite orbit and attitude cannot be adjusted quickly, so there is no opportunity for multiple shootings. Furthermore, interferences from various factors such as a cloud thickness and light often causes a single-shot image to be unusable. And the agricultural project monitoring must meet a time requirement of its progress, but the adoption of the high-altitude remote sensing is obviously unable to cooperate with the implementation.

Usually, agricultural projects also adopt auxiliary monitoring methods such as manual data sampling, for example, reporting text materials along with video and image materials. However, the video and image materials by manual shootings only show clearly things within a few tens of meters around a shooting point, and most of them are side-view images with limited coverage areas. Therefore, these video and image materials cannot well present effects of the entire agricultural project, and are difficult to be further analyzed and utilized.

Operating small unmanned aerial vehicles (UAVs) for shooting is also a way of monitoring agricultural projects that has been widely mentioned in recent years. However, the videos and images of cultivated land shot by the UAVs are continuously shot, and most of them do not have specific geographic location information. Therefore, it is very difficult to manually identify fields, roads and water conservancy facilities from thousands of acres at a monitoring site, which also needs extremely high workload. Furthermore, it is also impossible to further label and analyze these images by means of manual identification at the monitoring site.

A 3D cultivated land model can be generated from a two-dimensional (2D) image material of the UAV via the 3D reconstruction to achieve an effect similar to a close-up bird's-eye view, and can largely assist in an on-site manual visual inspection. Fields, wastelands, forests, buildings, field roads, and water conservancy ditches with geographic location information can be clearly seen from the 3D cultivated land model, and further studies can be conducted on the basis of these models to construct a system that automatically recognizes and calculates lengths, areas and damage statuses of these features. However, the reconstruction of a 3D model usually requires a huge amount of computation and a support of a high-performance computing device. Taking into account a battery power of an existing commercial UAV, the UAV can fly in the air for about 20 minutes. A huge amount of calculation work is required for image mosaic and then the 3D reconstruction of the cultivated land only based on the conventional methods, which at least takes more than a few hours, and is unrealistic for monitoring agencies to conduct an on-site monitoring, an acceptance, and a review. In addition, this technology requires a great bandwidth and a good network quality, thus, once a collection is performed in an area with a poor network quality, data cannot be uploaded in real time, which brings serious lag to the reconstruction.

SUMMARY

In order to overcome the above-mentioned shortcomings of the conventional art, the present disclosure provides a 3D reconstruction method based on an on-site edge-cloud collaboration for a cultivated land, which is mainly oriented to agricultural project monitoring scenes. For the 3D reconstruction of the cultivated land, an edge computing device is introduced to perform advance calculations, and an advantage of parallel calculations on the cloud is fully utilized, to reduce reconstruction time and a data transmission amount of the 3D model, in order to improve a response speed and a quality of a 3D reconstruction result.

A technical solution adopted by the present disclosure to solve the above-mentioned technical problems is to provide a 3D reconstruction method based on an on-site edge-cloud collaboration for a cultivated land, including:
  S1. acquiring cultivated land images shot by an unmanned aerial vehicle (UAV) and transmitting the cultivated land images to an edge computing device;
  S2. performing an image metadata extraction and a corresponding image preprocessing by the edge computing device;
  S3. dividing the preprocessed image dataset by the edge computing device;
  S4. arranging and deploying 3D reconstruction containers in a cloud data center according to division results, and transmitting images required by subtasks corresponding to the division results to corresponding containers by the edge computing device;

S5. performing the same 3D reconstruction steps by each of the 3D reconstruction containers in the cloud data center, on its assigned images to generate a 3D sub-model;

S6. establishing a geographic reference coordinate for a 3D model on the cloud data center, and generating a digital surface model, a digital terrain model, and orthophotos;

S7. combining all the 3D sub-models on the cloud data center, and performing a mosaic processing and an image enhancement processing on the orthophotos after the 3D reconstruction; and S8. providing a retrieval and an on-demand download for the 3D model by the edge computing device; wherein the 3D model comprises a plurality of 3D sub-models.

Optionally, the step S2 includes:

S21. extracting attributes related to the image by the edge computing device; wherein the attributes related to the image comprise exposure information, a focal length, shooting time, a shooting location, and a relative height of the unmanned aerial vehicle and its reference object;

S22. removing images irrelevant to or not helpful for the 3D reconstruction according to the relative height information of the unmanned aerial vehicle when each image in image data is shot;

S23. deleting redundant images in an over-dense image area according to a position difference of adjacent shot images; and S24. deleting redundant images according to a difference of a image content coverage.

Optionally, the step S3 includes:

S31. acquiring the number of available containers in the cloud data center, and a shooting route and an image coverage in the image metadata;

S32. calculating a convex hull of the image coverage, and dividing the convex hull into parts, the number of which is equal to the number of the available containers according to the number of the available containers, wherein, each part is called as a subregion, and a 3D reconstruction task of each subregion corresponds to the container on the cloud data center one-by-one; wherein the convex hull is a convex polygon formed by connecting outermost points of an entire aerial photograph field, and the convex polygon contains all points in a point set; and S33. when a number of images about a certain subregion is less than a preset threshold, searching for nearby images to supplement the number of images by performing an N-nearest neighbor search and matching a geohash prefix using a geohash attribute in the metadata.

Optionally, the step S5 includes:

extracting image feature points according to an SIFT detection algorithm, and performing a feature point matching to form a sparse point cloud;

forming a dense point cloud by using a 3D reconstruction algorithm based on patches; and performing a surface reconstruction and a texture mapping on the dense point cloud by using a Delaunay triangulation and a Power Crust algorithm, to generate the 3D sub-model.

Optionally, the step S8 includes:

tracking a reconstruction progress of each container in real time by the edge computing device; after the reconstruction is completed, providing the retrieval to find the 3D model and images for a corresponding location, and providing the on-demand download to download the 3D model and related files to the local.

The positive effects of the present disclosure includes: for an application of the 3D reconstruction in a cultivated land monitoring, according to the disclosure, a method of quickly acquiring large-scale 3D reconstruction images on-site is considered, and an edge-cloud collaborative computing is used for a fast 3D reconstruction. Specifically, the edge-cloud collaborative computing (advance+parallel) is used for the fast 3D reconstruction.

1. A local edge server performs advance calculations for filtering and preprocessing an image dataset, which reduces an amount of data transmission and data transmission time; the image dataset is divided according to an operation status of the cloud data center, and cloud computing resources are configured in the form of containers;
2. The UAV images are divided into several groups according to plots, uploaded to the cloud data center, and assigned to multiple containers to perform parallel calculations;
3. Sub-images of the parallel calculations are mosaicked to obtain a whole image of the field; and
4. Functions of a retrieval and an on-demand download for the 3D model are provided by the edge computing device.

Therefore, a combination of an edge computing and a cloud computing is used in the 3D reconstruction of the cultivated land to realize a fast reconstruction of the 3D model.

Other features and advantages of the present disclosure will be described in the following description, and partly become obvious from the description, or understood by implementing the present disclosure. The purpose and other advantages of the present disclosure can be realized and acquired by the structures specifically pointed out in the written description, claims, and drawings.

The technical solutions of the present disclosure will be further described in detail below with the accompanying drawings and embodiments.

BRIEF DESCRIPTION OF THE DRAWINGS

The accompanying drawings, which constitute a part of the description, are used to provide a further understanding of the present disclosure, and to explain the present disclosure together with the embodiments of the present disclosure, but are not limitations to the present disclosure. In the accompanying drawings.

DETAILED DESCRIPTION OF THE EMBODIMENTS

Hereinafter, exemplary embodiments of the present disclosure will be described in more detail with reference to the accompanying drawings. Although the drawings show exemplary embodiments of the present disclosure, it should be understood that the present disclosure can be implemented in various forms and should not be limited by the embodiments set forth herein. On the contrary, these embodiments are provided understand the present disclosure more thoroughly and to fully convey the scope of the present disclosure to those skilled in the art.

Figure 1:
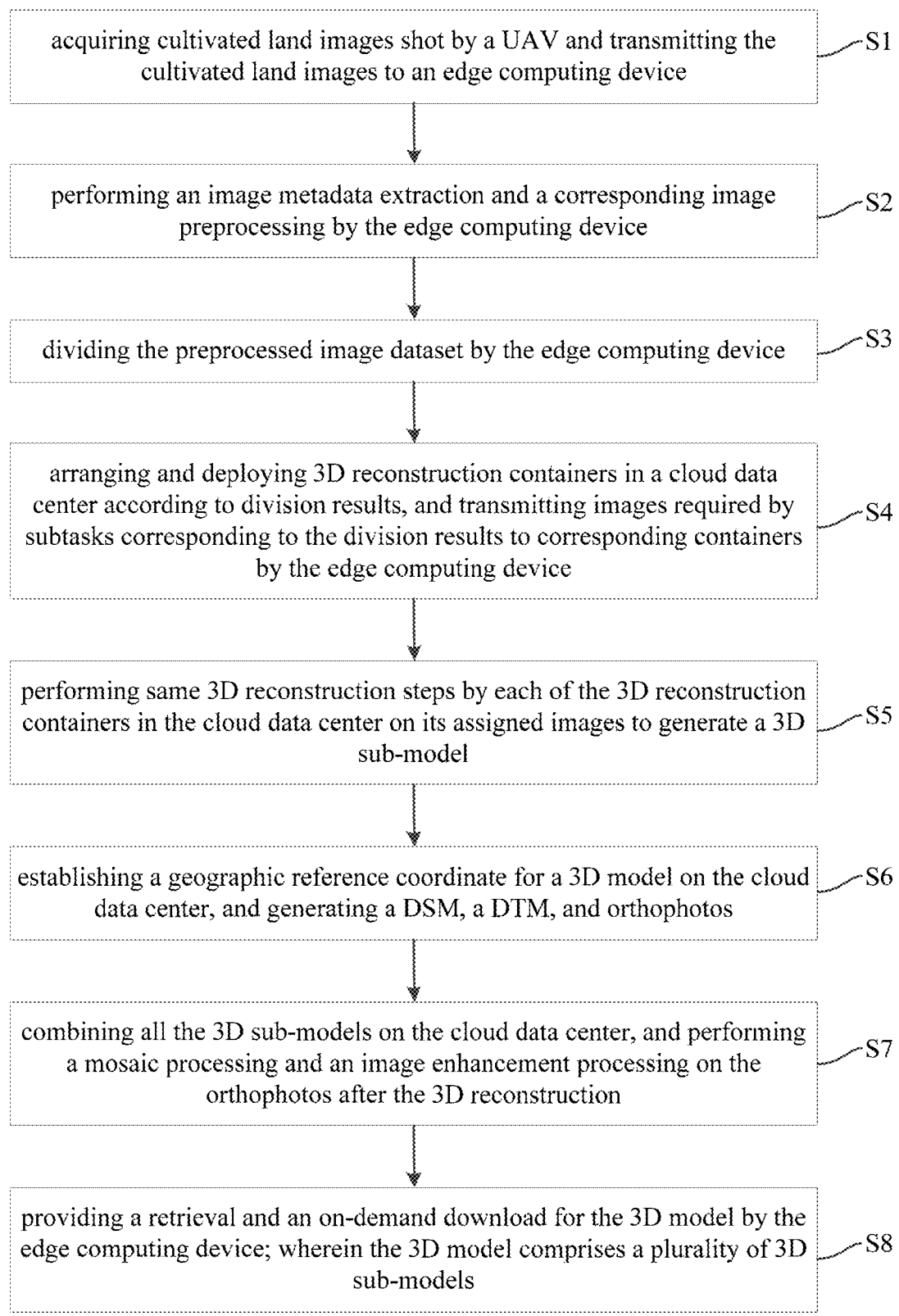
FIG. 1 is a flow chart showing a 3D reconstruction method based on an on-site edge-cloud collaboration for a cultivated land according to an embodiment of the present disclosure.

Referring to FIG. 1, a 3D reconstruction method based on the on-site edge-cloud collaboration for a cultivated land according to an embodiment of the present disclosure includes:

S1. acquiring cultivated land images shot by a UAV (Unmanned Aerial Vehicle) and transmitting the cultivated land images to an edge computing device;

S2. performing an image metadata extraction and a corresponding image preprocessing by the edge computing device;

S3. dividing the preprocessed image dataset by the edge computing device;

S4. arranging and deploying 3D reconstruction containers in a cloud data center according to division results, and transmitting images required by subtasks corresponding to the division results to corresponding containers by the edge computing device;

S5. performing same 3D reconstruction steps by each of the 3D reconstruction containers in the cloud data center on its assigned images to generate a 3D sub-model;

S6. establishing a geographic reference coordinate for a 3D model on the cloud data center, and generating a DSM (Digital Surface Model), a DTM (Digital Terrain Model), and orthophotos;

S7. combining all the 3D sub-models on the cloud data center, and performing a mosaic processing and an image enhancement processing on the orthophotos after the 3D reconstruction; and S8. providing a retrieval and an on-demand download for the 3D model by the edge computing device; wherein the 3D model comprises a plurality of 3D sub-models.

In this embodiment, in an application scenario of the 3D reconstruction, the infrastructure mainly includes four parts: an edge terminal (UAV), an edge computing device, a back-end cloud data center, and an edge network facility.

The edge terminal has basic functions such as data collection, storage, and basic transmission. In general 3D reconstruction application scenarios, the edge terminal may include a smart camera, a UAV, and a smart robot. Since the 3D reconstruction is performed on the cultivated land, the UAV is used as the edge terminal in this solution. The edge computing device is a device with certain computing, storage, and communication capabilities, such as an edge server, an edge embedded device, and an edge gateway. In weak network environments such as suburban and rural areas, the edge computing device will be used for advance calculations to preprocess the collected image datasets. A server located at an edge location is used as an edge core device in the present disclosure. The cloud data center has powerful computing and storage capabilities. In the 3D reconstruction, the cloud data center can process a large amount of image data by means of its powerful cloud computing capabilities. The edge network facilities include established multi-operator networks, such as 4G and 5G networks of China Mobile, China Unicom, and China Telecom.

In this embodiment, the method is mainly oriented to agricultural project monitoring scenarios. For the 3D reconstruction of the cultivated land, the edge computing device is introduced to perform advance calculations, and an advantage of parallel calculations on the cloud are fully utilized, to reduce reconstruction time and a data transmission amount of the 3D model, in order to improve a response speed and a quality of a 3D reconstruction result, for improving work efficiency when used in a large-scale on-site monitoring, an acceptance, and a review of the agricultural project.

Figure 2:
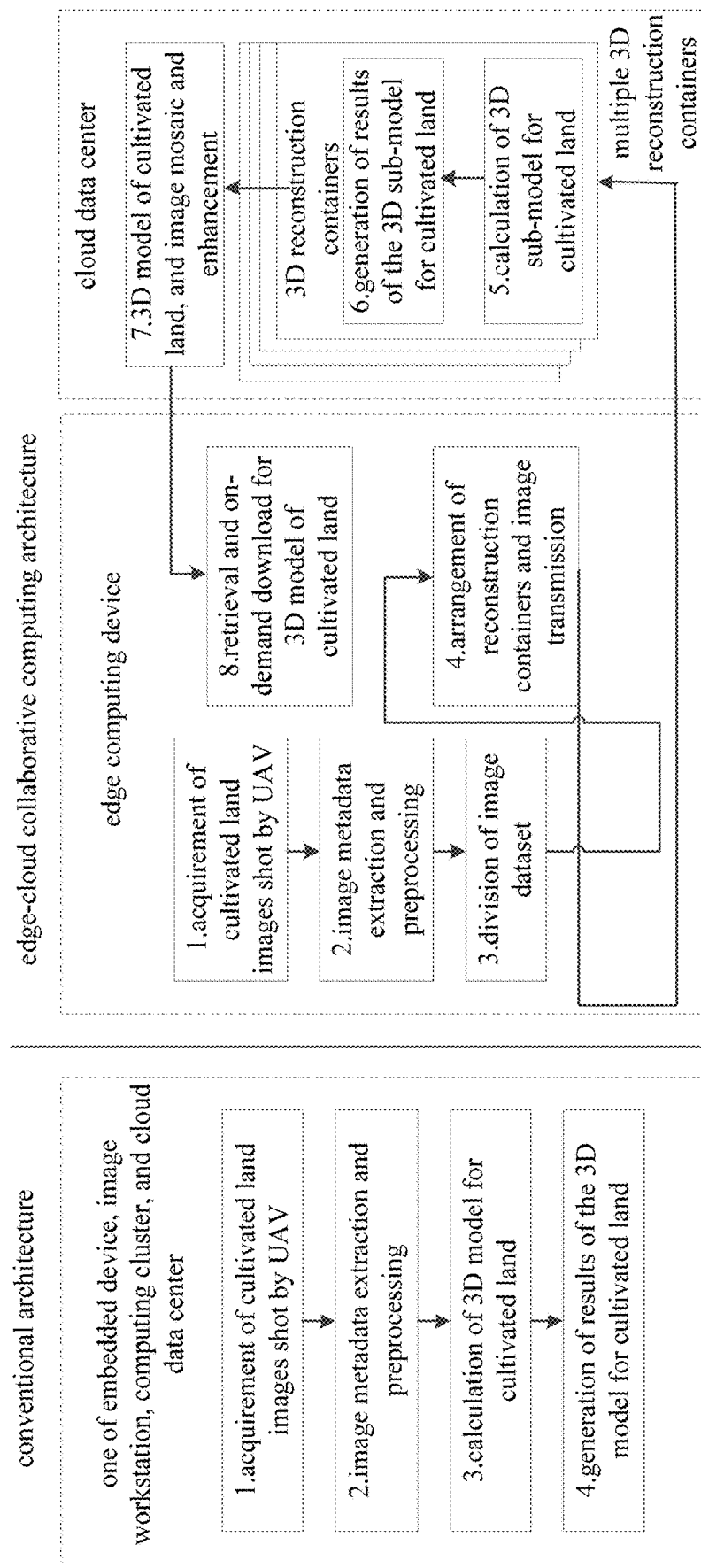
FIG. 2 is a diagram showing a comparison between a collaborative architecture based on an edge-cloud computing architecture according to an embodiment of the present disclosure and a conventional architecture.

Referring to FIG. 2, the right half of the FIG. 2 shows a collaborative architecture of an edge-cloud computing architecture according to an embodiment of the present disclosure. Based on this architecture, 8 steps of the 3D reconstruction method based on the on-site edge-cloud collaboration for the cultivated land according to an embodiment of the present disclosure are described hereafter.

Step 1: The cultivated land images shot by the UAV are acquired by the edge computing device.

The cultivated land images shot by the UAV are acquired and transmitted to the edge computing device. For example, control softwares such as DJI Ground Station (GS Pro) and DJI Terra can be run on edge devices. These softwares include a function of automatically generating routes according to a selected target cultivated area for an advance plan, such that images can be input into the edge computing device at one time after the cultivated land is photographed.

Step 2: The image data extraction and preprocessing are performed by the edge computing device.

The image metadata is extracted as attributes related to a specific analysis of a image. Generally, these data are attached to an image file in a form of EXIF key-value. When performing the subsequent 3D reconstruction, the attributes that may be used include exposure information, a focal length, shooting time, a shooting location (i.e. GPS latitude and longitude), a height and its reference, etc. Metadata is stored in a form of several tables as required, archived and stored in a structured database or static files.

After UAV images are transmitted to the edge computing device, the edge computing device performs a corresponding image preprocessing, including the following steps:

1. according to the relative height information of the UAV at the time of shooting for each image in the image data, images that are irrelevant to or not helpful for the 3D reconstruction are filtered out, such as images shot during take-off and landing. For example, a specific method that can be used is to calculate a median of flying heights for all the images and mark it as a reference shooting height, and to delete images whose flying heights are too far from the reference shooting height and images whose flight heights change too much.

2. redundant images in the over-dense image area are deleted according to the position difference of adjacent shot images. The difference comparison of image positions is specifically conducted by calculating a relative distance of five consecutive images, and if a position change between the first image and the fifth image is less than a preset threshold, such as 20 meters, the second and fourth images are deleted.
3. redundant images are deleted according to the difference of the image content coverage. The image content coverage is calculated as follows: image feature points, i.e. some points in the image that are obvious and easy to detect and match, from two adjacent images are extracted, and after these feature points are matched, image coordinate transformation parameters are calculated to calculate an image overlap degree. If the overlap degree of adjacent images exceeds a certain threshold, only one of the images is kept.

Above preprocessing steps may reduce low-quality images to be transmitted to the cloud data center, thereby reducing a bandwidth pressure, a traffic overhead, and a reserved bandwidth cost of a connection between the edge computing device and the cloud data center. On the other hand, a reduction of low-quality images may reduce the number of abnormal points in point cloud matching, and significantly improve the quality of the 3D reconstruction results.

Step 3: The cultivated land image dataset is divided by the edge computing device.

Regarding the cultivated land 3D reconstruction scene, in this embodiment, parts with a large amount of calculation and higher requirements on computing and storage resources in the 3D reconstruction process are selected to place in the cloud data center for processing. Multiple virtual containers can be dynamically adjusted and deployed in the cloud data center. Correspondingly, parallel computing can be adopted to accelerate the 3D reconstruction process. Therefore, according to the present disclosure, a large-scale 3D reconstruction task of the cultivated land are divided into several 3D reconstruction subtasks, and placed into multiple 3D reconstruction containers to generate several 3D sub-models, and finally the 3D sub-models and associated images thereof are merged.

The specific division steps are as follows:
In order to divide the large-scale 3D reconstruction task of cultivated land into several subtasks, the edge computing device will divide the image dataset, and then hand it over to the reconstruction container in the cloud data center for processing. The specific method of division of the cultivated land image dataset is introduced as follows:
1. acquiring the number of available containers in the cloud data center, and the shooting route and image coverage in the image metadata;
2. calculating a convex hull of the image coverage, and dividing the convex hull into parts, the number of which is equal to the number of the available containers, according to the number of the available containers, wherein, each part is called as a subregion, the 3D reconstruction task of each subregion corresponds to the container on the cloud one-by-one, and these subregions are similar in area and have regular shapes, which is convenient for reconstruction and visual inspection; wherein the meaning of the convex hull in the embodiment of the present disclosure is as follows: given a point set on the two-dimensional plane of the entire field, the convex hull is the convex polygon formed by connecting outermost points of an entire aerial photograph field, and the convex polygon contains all points in the point set;
3. when the number of images about a certain subregion is less than a preset threshold, searching for nearby images to supplement the number of images by performing the N-nearest neighbor search and matching the geohash prefix using the geohash attribute in the metadata.

Step 4: The arrangement of the reconstruction containers and image transmission.

The 3D reconstruction processing has high dependence and coupling. In the embodiment of the present disclosure, containerization and Microservice/Macroservice methods are used in the cloud data center to encapsulate the processing, and multiple 3D reconstruction subtasks can be processed in parallel by means of arrangement.

After arranging and deploying the 3D reconstruction containers, the edge computing device transmits the images required by a corresponding subtask to a designated container via the edge network infrastructure. The edge computing device monitors the network transmission status at the same time, and tracks the status of the container and the status of the 3D reconstruction subtasks. Common tracking methods include heartbeat, poll, etc. If the transmission fails or the container is malfunctioning, the edge computing device will re-execute the container deployment and image transmission.

Step 5: The calculation of the 3D sub-model of the cultivated land on the cloud.

Each 3D reconstruction container in the cloud data center performs the same 3D reconstruction steps for its assigned image sub-dataset to generate the 3D sub-model. The 3D reconstruction method based on point cloud is relatively mature, which can represent 3D real scenes or objects as a series of 3D spatial points. And sparse point clouds are also from image feature points. The detection of feature points is the most basic step in the entire 3D reconstruction process. The quality of the detection effect has a great influence on the final result. Commonly used detection algorithms include SIFT, SURF, etc. For example, the widely used SIFT algorithm can be chosen to extract feature points. The technology used to generate sparse point clouds is mainly SfM (Structure from Motion). After detecting all the feature points of each image, a feature point matching is also performed to form a sparse point cloud. The 3D reconstruction algorithm based on patches can be used to generate a dense point cloud. After the dense point cloud is generated, the outline of the 3D model can basically be recognized with the naked eyes. In order to realize the real three-dimensional object, the surface reconstruction needs to be performed by using the Delaunay triangulation and the Power Crust algorithm according to the embodiment of the present disclosure. After the surface reconstruction on the point cloud data, the outline and shape of the real scenes or objects are clearly visible. At last, a texture mapping is performed to make the reconstructed 3D model closer to the real scenes or objects, with color, texture and detail characteristics.

Step 6: The generation of 3D sub-model results of the cultivated land on the cloud.

In the monitoring scene of the cultivated land, it is necessary to establish the geo-referenced coordinates of the 3D model, and generate the Digital Surface Model (DSM), the Digital Terrain Model (DTM) and the Orthophotos at the same time. The DTM is widely used in the calculation of the area, volume, and slope of various cultivated land, and can be used for the visibility judgment between any two points in the model and the drawing of any cross-sectional diagram. In the application of cultivated land monitoring, the DTM is used for drawing contour lines, slope and aspect maps, and stereo perspective maps, used to make orthophoto maps and a map revision. The DTM can also be used as auxiliary data for field classification. In the embodiment of the present disclosure, while calculating the 3D sub-model, a corresponding model result file is also generated and stored in the reconstruction container. The specific files involved include, for example, point clouds (in LAZ format or PLY format), orthophotos (in GeoTIFF format, PNG format, MBTiles format, or Tiles format), and rendered 3D sub-models (in OBJ format).

Step 7: 3D models of the cultivated land on the cloud and image mosaic and enhancement.

After the 3D sub-models are generated by the 3D reconstruction container on the cloud, the 3D sub-models are further merged on the cloud, and the orthophotos after the 3D reconstruction is mosaicked, for example, seamless mosaic.

After the mosaic is completed, the 3D model and image enhancement processing will continue to be performed on the cloud, such as feathering, sharpening, and contrast enhancement. For example, the contrast of the image can be enhanced, and the white balance of the image can be adjusted by linear stretching or Gaussian stretching.

Processing software such as ENVI is used to apply various image enhancement algorithms to the image data, so that the processed images are more suitable for specific application requirements than the original images.

Regarding the image enhancement, a spatial domain enhancement processing can be used to enhance the thin part or main part of a linear object in the image. The spatial domain enhancement processing includes convolution filtering processing, such as high-pass filtering, low-pass filtering, Laplacian, and directional filtering. In addition to the spatial domain enhancement processing, a radiation domain enhancement processing and a spectral enhancement processing can also be used. The radiation domain enhancement processing performs the enhancement processing by transforming gray values of individual pixels, such as histogram matching, and histogram stretching. The spectral enhancement processing, such as a principal component transformation, an independent principal component transformation, a color space transformation, transforms a band to achieve the effect of image enhancement based on multi-spectral data.

Step 8: A retrieval and an on-demand download for the 3D model are provided by the edge computing device.

The edge computing device can track the reconstruction progress of each container in the form of a browser web page in real time. After the reconstruction is completed, the retrieval is provided to find the 3D model and images for a corresponding location, and the 3D model and related files can be downloaded to the local as required, for browsing and viewing.

In the embodiment of the present disclosure, the above steps 1-4 are completed on the edge computing device, steps 5-7 are completed in multiple 3D reconstruction containers deployed in the cloud data center, and step 8 is completed on the edge computing device. This method fully considers the heterogeneity and the different processing capabilities of the edge computing device and the cloud data center, and proposes innovatively to cooperate with the edge computing device and the cloud computing platform to complete the entire 3D reconstruction process, which shortens the 3D reconstruction time by 79%, and achieves a 3D reconstruction on-site mapping.

A specific example is listed below to quantitatively analyze the performance improvement achieved by the edge-cloud collaborative computing architecture described in the embodiments of the present disclosure performing the 3D reconstruction of cultivated land compared with the conventional architecture.

In the specific example, the processing time of the conventional architecture is firstly measured. In the conventional architecture, the 3D reconstruction steps of cultivated land are performed on devices or device groups that are physically very close, such as an embedded device deployed in cultivated land in smart agriculture projects, an image workstation equipped for the monitoring personnel, and a computing cluster or a cloud data center owned by the monitoring organization. In comparison experiment about the specific example, a corresponding device was selected for measurement.

The specific reconstruction process includes reconstructing the complete dataset on the corresponding device or device group immediately after acquiring the image data.

TABLE 1

Comparison of complete reconstruction time of conventional 3D reconstruction

| Conventional architecture device/device group | Detailed introduction | Complete reconstruction time |
|---|---|---|
| Embedded device | NVIDIA Jetson TX2 (edge embedded development board) | 5 hours and 22 minutes (excluding transmission time) |
| Image workstation | Lenovo tower server (edge server) | 2 hours and 45 minutes (excluding transmission time) |
| Computing cluster | Physical server cluster, without virtualization technology | 2 hours and 22 minutes (including transmission time) |
| Cloud data center | Virtual machine cluster, using Xen virtualization technology | 2 hours and 32 minutes (including transmission time) |

When the method provided by the embodiment of the present disclosure is applied:

| This solution | Edge server + 3D reconstruction of the container cluster in the cloud data center, container deployment and arrangement | 32 minutes and 19 seconds (including transmission time) |
|---|---|---|

The edge-cloud collaborative computing architecture is used in this solution. After acquiring the image data, the edge computing device performs advance calculations, i.e. extracting metadata from the image dataset acquired by the UAV, and then dividing the image dataset according to the metadata. The edge computing device measures the performance of itself and that of the cloud data center, and chooses to arrange and deploy multiple 3D reconstruction containers in the edge or the cloud data center for the 3D reconstruction. Multiple reconstruction containers in the cloud data center execute reconstruction tasks in parallel to quickly obtain 3D reconstruction results. In this example, the edge computing device chose to divide data in the image dataset into 10 groups, and transmitted images to hand over to 10 reconstruction containers for reconstruction. While ensuring a reconstruction quality and delivering reconstruction results, the complete reconstruction time was shortened to 32 minutes and 19 second. Compared with the conventional architecture (Table 1), the reconstruction time is reduced by 79%-90%.

Experimental Configuration and Dataset:

A rack server used in the cloud data center in the experiment is a Dell PowerEdge R430 rack server. Each server is equipped with two Intel Xeon E5-2630 v3 2.4 GHz physical CPUs. With the support of Hyper-Threading Technology, each CPU can have 8 cores and 16 threads. The rack server has 256 GB of memory. The cloud data center uses X540-AT2 network cards of multiple Intel Ethernet controller 10 GbE to support full-duplex 10 Gbps network connections.

In this experiment, the Lenovo tower server is selected as the edge computing device of this experiment, which is equipped with an Ubuntu 16.04LTS operating system, an Intel i7-6700 3.4 GHz physical CPU, a memory of 8 GB, and an AMDRadeon RX 550 discrete graphics. The network card model of the edge server is Realtek RTL8168. This experiment is based on 8 M uplink bandwidth.

The dataset used in this experiment was acquired by aerial photography of DJI Phantom 4 UAV carrying an FC300S camera with an aperture of 2.8, the shutter speed of 1/640s, the focal length of 3.6 mm, and the pixel size of 4000*3000. The dataset contains about 330 acres of land. The study area is located in Miren Village, Gantang Town, Potou District, Zhanjiang City, Guangdong Province, and this area is flat and mainly cultivated land with a small amount of residential land. In this experiment, the UAV had flew for about 11 minutes with the aerial height of 59.5 meters, during which a total of 347 images were acquired, including those acquired during the take-off and landing process and covering about 330 acres of land.

Detailed Introduction of Embodiment

The specific implementation steps are as follows:

Step 1: The cultivated land images shot by the UAV are acquired by the edge computing device.

The process of acquiring UAV images is the process of transmitting the cultivated land images collected by the UAV to the edge computing device.

The specific process in this embodiment is to transmit all the images to the Lenovo edge tower server via the WiFi network at one time after the shooting of the cultivated land is completed.

Step 2: The image data extraction and preprocessing are performed by the edge computing device.

The extraction of the image metadata is performed by specifically analyzing the attributes related to the images. Generally, the metadata are attached to an image file in the form of EXIF key-value. When performing subsequent 3D reconstruction, the attributes that can be used include the exposure information, the focal length, the shooting time, the shooting location (i.e. GPS latitude and longitude), the height and its reference, etc. The three-axis speed of the UAV and the attitude of the PTZ during shooting are also very helpful for the subsequent image and 3D model analysis. The information and storage paths and manners of the image files, constitute the metadata, which are stored in the form of several tables as required, archived and stored in a structured database or static files.

The specific operation process of this embodiment is as follows:

A. Image Metadata Extraction:

The Jupyter-notebook server container is arranged and started on the Lenovo edge tower server to write interactive python scripts, and execute batch processing to read and organize the EXIF information of all image files. Wherein, the Python environment is Python 3.6 importing a series of widely used toolkits:

Python data science toolkit: such as pandas (for data processing), matplotlib (for mapping), and scipy (for calculation of spatial data);

Image manipulation toolkit: such as PIL (for image manipulation and EXIF information reading), and os (for manipulation in a file level);

Geographic Information Toolkit: such as pygeohash (for calculation of geohash), and gmaps (for Google map operation interface).

On this basis, related functions are written to extract and archive the metadata. Part of the metadata results (the first 12 records) are shown in Table 2 below;

TABLE 2

Extraction results of image data

| Number | Path | Longitude | Latitude | Height (m) | Geohash | Date and time | Block number |
|---|---|---|---|---|---|---|---|
| 0 | 1 DJ1-0001 JPG | 11055888 | 2125293 | 59437 | w7y8gufx29k1 | 2018 Feb. 27 09 43 21 | 0 |
| 1 | 2 DJ1-0002 JPG | 11055890 | 2125292 | 59837 | w7y8gufx1p6y | 2018 Feb. 27 09 43 23 | 0 |
| 2 | 3 DJ1-0003 JPG | 11055895 | 2125290 | 59737 | w7y8gufx478n | 2018 Feb. 27 09 43 25 | 0 |
| 3 | 4 DJ1-0004 JPG | 11055901 | 2125288 | 59437 | w7y8gufwgxuz | 2018 Feb. 27 09 43 27 | 0 |
| 4 | 5 DJ1-0005 JPG | 11055909 | 2125285 | 59537 | w7y8gufwvd2s | 2018 Feb. 27 09 43 29 | 0 |
| 5 | 6 DJ1-0006 JPG | 11055913 | 2125284 | 59537 | w7y8gufwy2w2 | 2018 Feb. 27 09 43 31 | 0 |
| 6 | 7 DJ1-0007 JPG | 11055922 | 2125281 | 59537 | w7y8gufy8dct | 2018 Feb. 27 09 43 33 | 0 |
| 7 | 8 DJ1-0008 JPG | 11055931 | 2125278 | 59437 | w7y8gufy6tkd | 2018 Feb. 27 09 43 35 | 0 |
| 8 | 9 DJ1-0009 JPG | 11055939 | 2125275 | 59437 | w7y8gufyhx8r | 2018 Feb. 27 09 43 37 | 0 |
| 9 | 10 DJ1-0010 JPG | 11055946 | 2125272 | 59337 | w7y8gufyn4hs | 2018 Feb. 27 09 43 39 | 0 |
| 10 | 11 DJ1-0011 JPG | 11055954 | 2125269 | 59337 | w7y8gugjbh84 | 2018 Feb. 27 09 43 41 | 0 |
| 11 | 12 DJ1-0012 JPG | 11055961 | 2125267 | 59737 | w7y8gugjc8u6 | 2018 Feb. 27 09 43 43 | 0 |

The acquired results are saved in a structured database (specifically SQLite, considering the limited performance of the edge computing device) and backed up in a static csv file.

B. The Corresponding Image Preprocessing is Performed by the Edge Computing Device, Including the Following Steps:

The height information of each image in the image metadata is used to filter out irrelevant images, such as images shot during the process of take-off and landing. The specific method is to calculate the median of flying heights in all the images and mark it as the reference shooting height, and to delete images whose flying heights are too far from the reference shooting height and images whose flight heights change too much.

Figure 3:
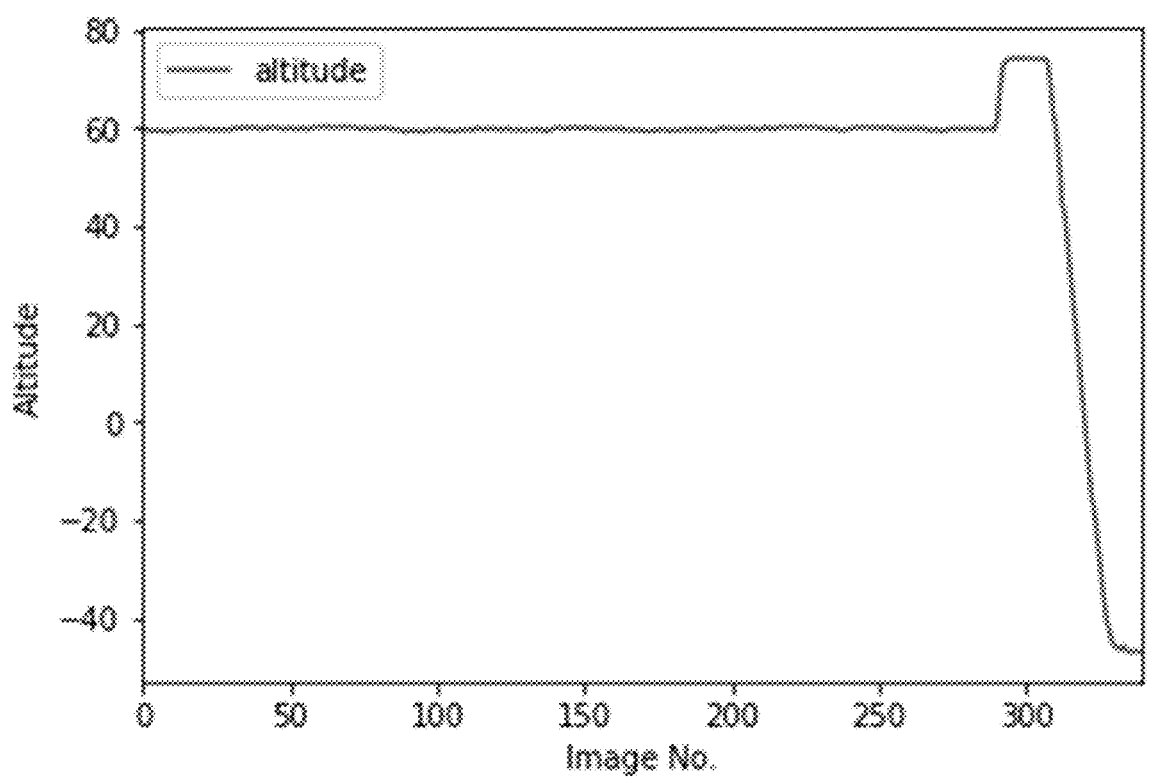
FIG. 3 is a graph showing relative altitude changes of the UAV according to a specific embodiment.

As shown in FIG. 3, the relative altitude changes of the UAV in 347 cultivated land images are shown, wherein, images subsequent to the $305^{th}$ image are images shot during the landing process, therefore, the images subsequent to the $305^{th}$ image may be deleted.

C. Deletion of Redundant Images in Aerial Photography:

Redundant images in the over-dense image area are deleted according to the position difference of adjacent shot images and the difference of the image content coverages. Specifically, the relative distance of five consecutive images is compared, and if a position change between the first image and the fifth image is less than a preset threshold, the second and fourth images are deleted.

Images with high overlap should be removed: the overlap of the entire dataset is read. For example, when the overlap is higher than the threshold 80%, the corresponding number of images will be deleted to reduce redundant data. In this specific example, the data amount of the original dataset is 1.8 GB (347 images), and after a filtering process, the data amount is reduced to 1.19 GB (251 images).

Step 3: The cultivated land image dataset is divided by the edge computing device.

In order to divide the large-scale 3D reconstruction task of cultivated land into several subtasks, the edge computing device will divide the image dataset, and then hand it over to each reconstruction container in the cloud data center for processing. The specific image dataset division method is introduced as follows:

The number of containers available in the cloud data center is acquired. In this embodiment, the number of containers is 10. And then the shooting route and the image coverage in the image metadata are acquired. The convex hull of the entire image coverage is calculated, and is divided into 10 subregions equal to the number of the available containers according to the number of the available containers, each one of which is called a subregion, and the 3D reconstruction task of each subregion corresponds to the container on the cloud data center one-by-one. In the step 2, the number of images has been reduced to 251, and the 251 images continue to be divided into ten groups (respectively including 30, 23, 18, 18, 14, 33, 25, 26, 26, 38 images).

In this example, steps 2-3 take 14 seconds in total.

Step 4: The arrangement of the reconstruction containers and image transmission.

In this solution, the containerization and Microservice/Macroservice are used in the cloud data center to encapsulate the processing, and multiple 3D reconstruction subtasks may be processed in parallel by means of arrangement. Since the container management engine of the connected cloud data center is the Docker container engine widely used in recent years, correspondingly, in this embodiment, the Dockerfile is conventionally written to describe the Docker image used, the installation runtime library, and the specific execution logic and execution entry.

The edge computing device may be connected to the Kubernetes service page to monitor the deployment status of 3D reconstruction containers on the cloud.

In order to reduce upload time, in this example, three parallel network paths are used to upload the previously divided 10 groups of images at the same time. Specifically the 10 groups of images are divided into three groups (respectively including 83, 81 and 87 images respectively) equally according to a "3+3+4" grouping method, and uploaded to the corresponding containers of the cloud data center (see the container number in Table 3) via the three parallel network paths at the same time, wherein, the upload time of respective groups are 18 minutes and 42 seconds, 19 minutes, and 18 minutes and 55 seconds.

Step 5: The calculation of the 3D sub-model of the cultivated land on the cloud.

Reconstruction containers execute the 3D reconstruction process in parallel, including an image feature point detection, a sparse cloud reconstruction, a dense cloud reconstruction, and a meshing and texturing of the 3D model. The time required is listed in the Table 3 below.

TABLE 3

Time used for the upload by the edge device and 3D parallel reconstruction in the cloud in the embodiment

| Container number | The time for uploading from the edge computing device to the reconstruction container on the cloud in step 4 | 3D reconstruction processing time | Total processing time |
|---|---|---|---|
| 1(30 images) | 18 minutes and 42 seconds | 08 minutes and 31 seconds | 31 minutes and 25 seconds |
| 2(25 images) | | 11 minutes and 19 seconds | |
| 3(26 images) | | 10 minutes and 49 seconds | |
| 4(23 images) | 19 minutes and 00 seconds | 12 minutes and 25 seconds | |
| 5(25 images) | | 07 minutes and 44 seconds | |
| 6(38 images) | | 10 minutes and 09 seconds | |
| 7(18 images) | 18 minutes and 55 seconds | 05 minutes and 53 seconds | |
| 8(18 images) | | 09 minutes and 40 seconds | |
| 9(14 images) | | 07 minutes and 44 seconds | |
| 10(33 images) | | 09 minutes and 59 seconds | |

The upload time of the three parallel network paths is selected as the longest time, i.e. 19 minutes.

Parallel computing time for 10 containers of the cloud server is selected as the longest computing time of 10 containers, i.e. 12 minutes and 25 seconds.

Step 6: The generation of 3D sub-model results of the cultivated land on the cloud.

In the monitoring scene of the cultivated land, it is necessary to establish the geo-referenced coordinates of the 3D model, and generate the Digital Surface Model (DSM), the Digital Terrain Model (DTM) and the Orthophotos at the same time. Corresponding model result files are also generated and stored in the reconstruction container. The specific files involved include, for example, point clouds (in LAZ format or PLY format), orthophotos (in GeoTIFF format, PNG format, MBTiles format, or Tiles format), and rendered 3D sub-models (in OBJ format).

Figure 4:
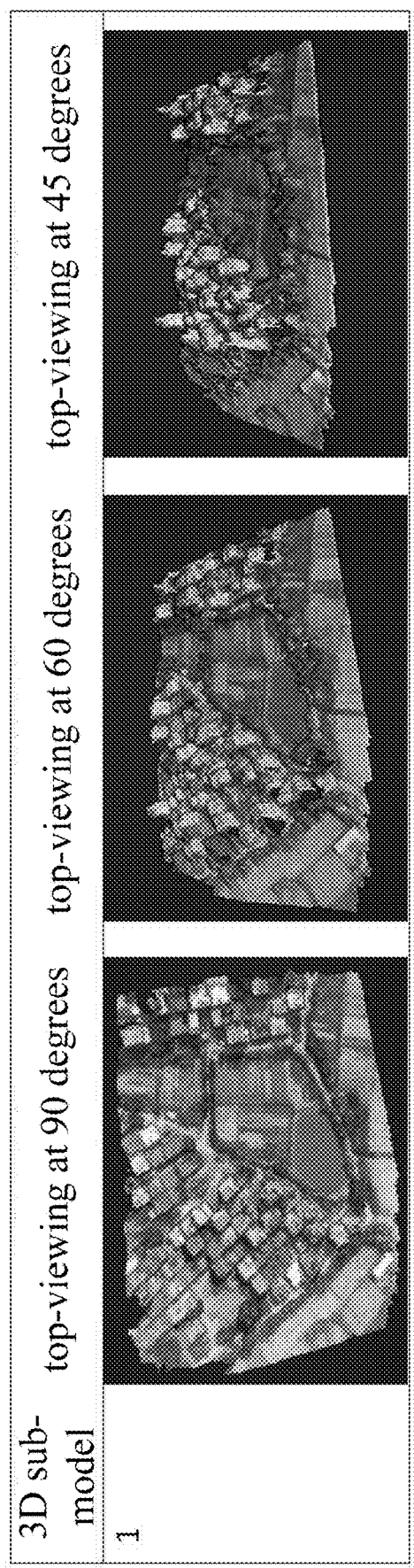
FIG. 4 is a diagram showing results of the 3D modeling in one of the containers according to a specific embodiment.

FIG. 4 shows a schematic diagram of the result of 3D modeling of one of the 10 containers.

Step 7: 3D models of the cultivated land on the cloud and image mosaic and enhancement.

Figure 5:
FIG. 5 is a schematic diagram showing a seamless mosaic of orthophotos of 10 3D sub-models of the cultivated land according to a specific embodiment.

After the 3D sub-models are generated by the 3D reconstruction container on the cloud, the 3D sub-models are further merged on the cloud, and the orthophotos after the 3D reconstruction is mosaicked, for example, seamless mosaic, as shown in FIG. 5.

After the mosaic is completed, the 3D model and image enhancement processing will continue to be performed on the cloud, such as feathering, sharpening, and contrast enhancement. For example, by linear stretching or Gaussian stretching, the contrast of the image may be enhanced, and the white balance of the image may be adjusted.

Figure 6:
FIG. 6 is a schematic diagram showing a result after the seamless mosaic of orthophotos of 10 3D sub-models of the cultivated land according to a specific embodiment.

In this embodiment, the ENVI software and runtime library are deployed on the containers on the cloud, 10 3D sub-models are transferred to the containers, and the orthographic top-view image of the 3D reconstruction model is selected. The Seamless Mosaic function in the ENVI runtime library is called, and 10 orthographic top-view images are added successively. Wherein, the first sub-image is used as the mosaic reference layer, and the other 9 sub-images are used as the correction layers, and an automatically drawing edge line processing is chosen to perform; and in an output panel, a triple convolution interpolation method is selected for performing a re-sampling processing, and then the seamless mosaic is performed. The seamless mosaic process takes 2 minutes and 10 seconds to get the mosaicked result as shown in FIG. 6.

Figure 7:
FIG. 7 is a diagram showing a result after a contrast enhancement for FIG. 6 according to a specific embodiment.
Figure 8:
FIG. 8 is a diagram showing a result acquired by using a conventional 3D reconstruction method according to a specific embodiment.

Further, the mosaic result image is stretched by Gaussian to enhance the contrast of the image, as shown in FIG. 7. The comparison with the result obtained by the conventional 3D reconstruction method is as follows:

It can be seen that, since this solution uses the edge+cloud method, its 3D reconstruction saves 79% of the time compared with the conventional method, wherein the conventional method takes more than 2 hours and 30 minutes, and this solution only takes 32 minutes and 19 seconds, while two reconstruction effects of the two methods are completely comparable and this solution fully meets the requirements of agricultural project monitoring.

Step 8: The retrieval and the on-demand download for the 3D model are provided by the edge computing device.

The edge computing device may track the reconstruction progress of each container in the form of a browser web page in real time. After the reconstruction is completed, the retrieval is provided to find the 3D model and images thereof for a corresponding location, and the 3D model and related files may be downloaded to the local as required, for further browsing and analysis.

In this specific embodiment, a calculation of a total time-consuming for the preprocessing of the edge+parallel upload+parallel 3D reconstruction+download of 3D reconstruction results includes:

Preprocessing of edges (removal of overlap and grouping): 14 seconds in total;
Upload time via the three parallel network paths: taken as the longest time of the three parallel network paths, i.e. 19 minutes;
Parallel computing time of 10 containers of cloud server: taken as the longest computing time of 10 containers, i.e. 12 minutes 25 seconds;
Download of the results of 3D reconstruction: 40 seconds in total;

Then the total time=14 seconds+19 minutes+12 minutes and 25 seconds+40 seconds=32 minutes and 19 seconds.

The total time taken by this solution is 32 minutes and 19 seconds. When the image quality meets the needs of agricultural monitoring, the use of "edge-cloud" computing coordination may reduce the reconstruction time by 79%-90%.

According to the 3D reconstruction method based on the on-site edge-cloud collaboration for the cultivated land provided by the embodiment of the present disclosure, the UAV is used to acquire the image materials of hundreds to thousands of acres of the cultivated land by the aerial photography, and then cooperates with the edge computing device and the cloud server with powerful computing functions to apply their best combination to the calculation process of the 3D reconstruction of cultivated land, to realize an on-site fast reconstruction of the 3D model with geographical location information, wherein, the generated model has a similar artificial visual effect, which may greatly assist in the artificial visual inspection. There are 3D fields, houses, crops, trees, grass, houses, roads, bridges, water conservancy ditches in the 3D model, from which the elevation and volume information of the terrain and the detailed geographic location information of the fields may be obtained. Therefore, the 3D model reconstructed based on this method may clearly and carefully check the inadequate constructions of roads, ditches, and fields for the purpose of the large-scale monitoring, acceptance, and review of agricultural projects.

The description of the above embodiments is only used to help understand the method and the core idea of the present disclosure. It should be pointed out that for those of ordinary skill in the art, without departing from the principle of the present disclosure, several improvements and modifications may be made to the present disclosure, and these improvements and modifications also fall within the scope of the claims of the present disclosure. Various modifications to these embodiments are obvious to those skilled in the art, and the general principles defined herein may be implemented in other embodiments without departing from the spirit or scope of the present disclosure. Therefore, the present disclosure will not be limited to the embodiments shown herein, but should conform to the widest scope consistent with the principles and novel features disclosed herein.

What is claimed is:
1. A 3D reconstruction method based on an on-site edge-cloud collaboration for a cultivated land, comprising:
S1) acquiring cultivated land images shot by an unmanned aerial vehicle and transmitting the cultivated land images to an edge computing device;
S2) performing an image metadata extraction and a corresponding image preprocessing by the edge computing device;
S3) dividing the preprocessed image dataset by the edge computing device;
S4) arranging and deploying 3D reconstruction containers in a cloud data center according to division results, and transmitting images required by subtasks corresponding to the division results to corresponding containers by the edge computing device;
S5) performing same 3D reconstruction steps by each of the 3D reconstruction containers in the cloud data center on its assigned images to generate a 3D sub-model;

S6) establishing a geographic reference coordinate for a 3D model on the cloud data center, and generating a digital surface model, a digital terrain model, and orthophotos;

S7) combining all the 3D sub-models on the cloud data center, and performing a mosaic processing and an image enhancement processing on the orthophotos after the 3D reconstruction; and S8) providing a retrieval and an on-demand download for the 3D model by the edge computing device; wherein the 3D model comprises a plurality of 3D sub-models, wherein the step S3 comprises:

S31) acquiring a number of available containers in the cloud data center, and a shooting route and an image coverage in the image metadata;

S32) calculating a convex hull of the image coverage, and dividing the convex hull into parts, a number of which is equal to the number of the available containers, according to the number of the available containers, wherein, each part is called as a subregion, and a 3D reconstruction task of each subregion corresponds to the container on the cloud data center one-by-one; wherein the convex hull is a convex polygon formed by connecting outermost points of an entire aerial photograph field, and the convex polygon contains all points in a point set; and S33) when a number of images about a certain subregion is smaller than a preset threshold, searching for nearby images to supplement the number of images by performing an N-nearest neighbor search and matching a geohash prefix by a geohash attribute in the metadata.

2. The 3D reconstruction method based on the on-site edge-cloud collaboration for the cultivated land according to claim 1, wherein the image metadata extracted in the step S2 is attached to the images in a form of an EXIF key-value.

3. The 3D reconstruction method based on the on-site edge-cloud collaboration for the cultivated land according to claim 1, wherein the step S2 comprises:

S21) extracting attributes related to the image by the edge computing device; wherein the attributes related to the image comprise exposure information, a focal length, shooting time, a latitude and longitude of the unmanned aerial vehicle, and a relative height of the unmanned aerial vehicle with respect to a ground of the cultivated land;

S22) removing images irrelevant to or not helpful for the 3D reconstruction according to the relative height information of the unmanned aerial vehicle when each image in image data is shot;

S23) deleting redundant images in an over-dense image area according to a position difference of adjacent shot images; and S24) deleting redundant images according to a difference of an image content coverage.

4. The 3D reconstruction method based on the on-site edge-cloud collaboration for the cultivated land according to claim 1, wherein in the step S4, transmitting the images required by the subtasks corresponding to the division results to the corresponding containers by the edge computing device comprises: transmitting the images required by the subtasks corresponding to the division results to corresponding containers via an edge network facility by the edge computing device; wherein the edge network facility comprises an established multi-operator network.

5. The 3D reconstruction method based on the on-site edge-cloud collaboration for the cultivated land according to claim 1, wherein the step S5 comprises:

extracting image feature points according to an SIFT detection method, and performing a feature point matching to form a sparse point cloud;

forming a dense point cloud by a 3D reconstruction method based on patches; and performing a surface reconstruction and a texture mapping on the dense point cloud by a Delaunay triangulation and a Power Crust method, to generate the 3D sub-model.

6. The 3D reconstruction method based on the on-site edge-cloud collaboration for the cultivated land according to claim 1, wherein the step S8 comprises:

tracking a reconstruction progress of each container in real time by the edge computing device; after the reconstruction is completed, providing results of the retrieval to find the 3D model and images for a corresponding location, and providing the on-demand download to download the 3D model and related files to local.

7. The 3D reconstruction method based on the on-site edge-cloud collaboration for the cultivated land according to claim 6, wherein the tracking the reconstruction progress of each container in real time by the edge computing device comprises: tracking the reconstruction progress of each container in real time by the edge computing device in a form of a browser web page.

* * * * *